(No Model.)
J. P. COLLINS.
WATER WHEEL.
No. 331,184.    Patented Nov. 24, 1885.
Fig. 1.
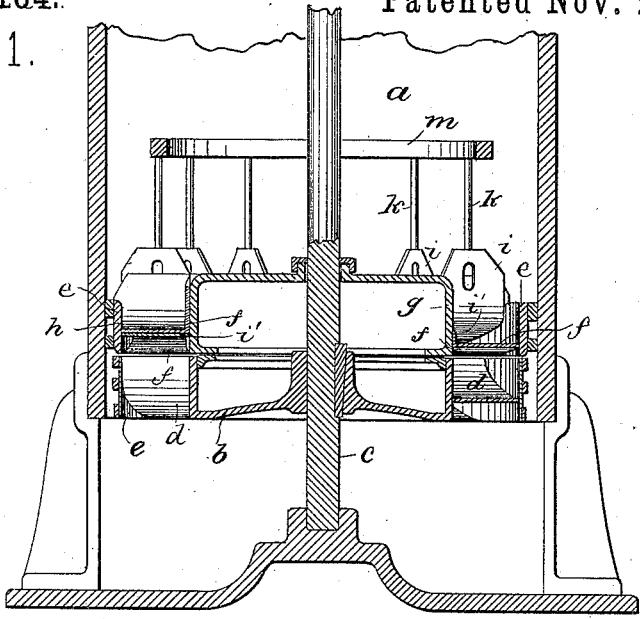
Fig. 2.
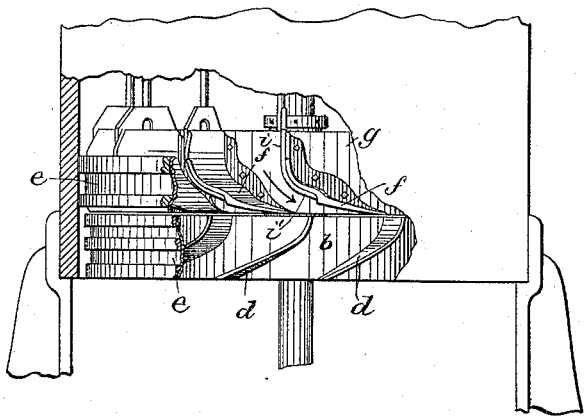
Fig. 3.
Witnesses
John F. Nelson
B. J. Noyes
Inventor
James P. Collins
by Crosby & Gregory Attys.

UNITED STATES PATENT OFFICE.

JAMES P. COLLINS, OF NEW LONDON, CONNECTICUT.

WATER-WHEEL.

SPECIFICATION forming part of Letters Patent No. 331,184, dated November 24, 1885.

Application filed February 2, 1885. Serial No. 154,658. (No model.)

*To all whom it may concern:*

Be it known that I, JAMES P. COLLINS, of New London, county of Norwich, State of Connecticut, have invented an Improvement in Water-Wheels, of which the following description, in connection with the accompanying drawings, is a specification, like letters on the drawings representing like parts.

My invention, relating to water-wheels of the class commonly known as "turbines," is especially applicable to the style of turbine known as the "Jonval," whether placed on a vertical or horizontal shaft.

The invention consists, essentially, in a novel construction of the gates and guides by which the amount of water and its direction of delivery to the wheel-buckets are controlled.

The main object of the invention is to secure a more perfect and uniform regulation of the jets or veins of water delivered to the buckets of the wheel, and to increase the efficiency of the wheel when working at any point of partial gate or with less than the maximum delivery of water, the improved gate being very sensitive to the action of a governor. The guides or "pitch-water" by which the water is directed to the buckets of the wheel are inclined in the opposite direction to the said buckets, so that the jets or veins of water issuing between the said guides press directly upon the wheel-buckets to actuate the same. In some instances heretofore the amount of water thus delivered to the wheel has been varied by a gate consisting of flat blades or vanes which extended down to and touched the guide below when closed in the same vertical plane, but such gates form a throat or obstruction "throttling" the water, which after passing them again expands or fills the space between the guides. Such gates in closing and diminishing the quantity of water supplied to the wheel also reduce the pressure of the supplied water, so that the wheels are much less efficient when running at partial gate than when running at full gate or with the maximum delivery of water.

My invention consists partly in the combination, with the guides, of sliding gates provided with projecting or guide portions, which give form to one side of the jet or vein of water, co-operating in doing so with the stationary guides, which give form to the opposite side of the jet or vein. These gates, when moved toward the opposite guide at the other side of the jet of water, diminish the sectional area of the said jet, or diminish the amount of water without materially changing its velocity, form, or pressure, so that the efficiency of the wheel or proportion of power derived to the quantity of water used is by my improvement greatly increased when working with diminished quantities of water or at "partial gate."

Figure 1 is a vertical section of a water-wheel embodying this invention. Fig. 2 is a side elevation thereof, a part of the case and outer rims of the guides being broken away to show the said guides and wheel-buckets in side elevation; and Fig. 3 is a diagram showing the gates in different positions from the maximum opening to the full closure.

The case $a$, receiving the water at a suitable inlet-passage and delivering the same through the wheel, may be of any ordinary form or construction. The wheel in this instance consists of a central hub, $b$, connected with the shaft $c$, and having around its periphery the inclined buckets or floats $d$, surrounded by an outer band or rim, $e$, being what is well known as a "Jonval" wheel. The water received in the case $a$ above the wheel is delivered in a downward stream to the buckets of the said wheel, through a pitch-water or series of guides, $f$, supported between a stationary central drum, $g$, and an outer band or rim, $e$, the said guide being arranged to deliver the water in an inclined direction against the buckets $d$, as indicated by the arrows in Figs. 2 and 3.

At the rear of each of the guides $f$, and arranged to slide thereon, is placed a blade or vane, $i$, having a curved inclined water-guiding portion, $i'$, (see Fig. 3,) which constitutes a portion of the guide for the water, co-operating with the forward side of the guide $f$ at the rear of the same, to constitute a tapering nozzle or chute, through which the water is delivered in a jet or vein which has substantially the same pressure, form, and velocity in all positions of the said movable blade $i$ with relation to the opposite stationary guide, *f*. The entire series of vanes *i* are connected by rods or braces *k* with a ring, *m*, which may be raised or lowered by any mechanism such as is commonly used for this purpose, the entire series moving simultaneously and constituting the gate by which the flow of water to the wheel is controlled. When the gate, composed of a series of vanes, *i*, is moved to its lowest position, the guiding portions *i'* of the said gate will seat upon the extremities of the co-operating guides, as shown at A, Fig. 3, thus wholly cutting off the flow of water or closing the gate.

The guides *f* are shown as provided with recesses *f'*, which receive the guide portions *i'* of the gate when the latter is fully open, as shown at B; but this construction is merely a preferable one, and might be omitted entirely without affecting my invention. The external surface of the stationary guide-drum *g* is turned off true, and the surrounding guide-rim *e* is bored out, so that in operation the edges of the blades or vanes *i* of the gate may be accurately fitted to slide closely between the drum *g* and rim *e*, forming with each of them a tight joint when the gate is closed.

The flat blades or vanes used heretofore as a gate on Jonval wheels were not provided with projecting or inclined guide portions for co-operating with the opposite stationary guides in giving form to the veins of water, and consequently diminished the amount of water supplied to the wheel by obstructing its flow, and thus diminishing the velocity and pressure of the amount used at the same time that the said amount is diminished. The improved gate forming the subject of the present invention, on the other hand, in closing diminishes the amount of water supplied to the wheel without obstructing the flow of the portion used, so that the water operates with full pressure and velocity, although with diminished quantity, when the gate is partially closed.

While the invention is herein represented as applied to a Jonval or downward discharge, it may be equally applied to a wheel resembling the Jonval, but involving only partially the Jonval form of bucket.

The water delivered by the guides to the wheel may be received by buckets in the wheel whose upper surface and characteristics are similar to those of Jonval buckets, but a portion of whose lower extremities may be curved or inclined either inwardly or outwardly to partially or wholly discharge the water in one of these directions, instead of discharging in the manner of the true Jonval bucket.

Such a wheel in its relative position to the pitch-water and in its manner of receiving the water would be essentially a Jonval wheel, the only variation being in the turn or twist given the extremity of the bucket; and I desire it to be understood that the application of my improved pitch-water or gate to such a wheel is within the scope of this invention, and by the term "Jonval wheel" I intend to include any wheel receiving the water in a downward direction, or in which the water passed into the wheel in a direction parallel with the axis of rotation thereof, rather than radiating inward or outward from the said axis.

I claim—

1. The combination, in a turbine of the class designated, of a water-wheel consisting of a central hub and buckets surrounding the same, with a series of guides for directing the water in an inclined direction to the said buckets, and a vertically-movable gate composed of a series of plates or vanes, each of said plates or vanes being adapted to slide on the rear face of one guide, and having a water-guiding curved or bent portion to abut the front lower portion of the next succeeding guide, as and for the purposes specified.

2. The combination, in a turbine of the class designated, of a water-wheel consisting of a central hub and buckets surrounding the same, with a series of guides for directing the water in an inclined direction to the said buckets, and a gate having a series of plates or vanes, each of said plates or vanes engaging the rear surface of one guide, and adapted to abut the toe or lower extremity of the next succeeding guide while in engagement with said preceding guide, whereby the sectional area of each vane is reduced at the point of delivery to the wheel without excluding the water from between the guides, substantially as set forth.

3. The combination of a series of stationary guides and a gate composed of a series of sliding plates or vanes having curved water-guiding portions co-operating with the stationary guides, as specified, with a water-wheel receiving the water substantially as it is received by a wheel of the class designated, but having portions of the buckets curved or inclined, so as to discharge the water in the manner substantially as described.

In testimony whereof I have signed my name to this specification in the presence of two subscribing witnesses.

JAMES P. COLLINS.

Witnesses:
LUCIUS BROWN,
DONALD G. PERKINS.